(12) United States Patent
Jeong et al.

(10) Patent No.: US 9,174,687 B2
(45) Date of Patent: Nov. 3, 2015

(54) LINK APPARATUS OF VARIABLE REAR SPOILER FOR VEHICLE

(71) Applicants: Hyundai Motor Company, Seoul (KR); Kia Motors Corp., Seoul (KR)

(72) Inventors: Phil Jung Jeong, Yongin-si (KR); Young Sub Oh, Suwon-si (KR); Seung Mok Lee, Osan-si (KR); Hyun Gyung Kim, Hwaseong-si (KR); Bock Cheol Lee, Suwon-si (KR); Dong Eun Cha, Suwon-si (KR)

(73) Assignees: HYUNDAI MOTOR COMPANY, Seoul (KR); KIA MOTORS CORP., Seoul (KR)

( * ) Notice: Subject to any disclaimer, the term of this patent is extended or adjusted under 35 U.S.C. 154(b) by 0 days.

(21) Appl. No.: 14/473,620

(22) Filed: Aug. 29, 2014

(65) Prior Publication Data
US 2015/0175223 A1    Jun. 25, 2015

(30) Foreign Application Priority Data
Dec. 20, 2013    (KR) .......................... 10-2013-0160188

(51) Int. Cl.
*B62D 35/00*    (2006.01)
(52) U.S. Cl.
CPC .................................... *B62D 35/007* (2013.01)
(58) Field of Classification Search
CPC ..................................................... B62D 35/007
USPC ........................................... 296/180.5, 180.1
See application file for complete search history.

(56) References Cited

U.S. PATENT DOCUMENTS

| | | | |
|---|---|---|---|
| 5,537,263 A * | 7/1996 | Kogita et al. | 359/841 |
| 7,481,482 B2 | 1/2009 | Grave et al. | |
| 2004/0256885 A1 | 12/2004 | Bui | |
| 2007/0145776 A1* | 6/2007 | Grave et al. | 296/180.5 |
| 2009/0160215 A1* | 6/2009 | Paul et al. | 296/180.5 |
| 2009/0284043 A1* | 11/2009 | Molnar et al. | 296/180.5 |
| 2009/0286461 A1* | 11/2009 | Molnar et al. | 454/152 |
| 2014/0021742 A1* | 1/2014 | Durm et al. | 296/180.5 |

FOREIGN PATENT DOCUMENTS

| | | | |
|---|---|---|---|
| DE | 102013106401 A1 * | 12/2014 | |
| EP | 2 007 615 B1 | 12/2008 | |
| EP | 2357121 A2 * | 8/2011 | |
| JP | 5-58352 A | 3/1993 | |
| JP | 2003-72366 A | 3/2003 | |
| JP | 2009-537364 A | 10/2009 | |

* cited by examiner

*Primary Examiner* — Jason S Morrow
(74) *Attorney, Agent, or Firm* — Morgan, Lewis & Bockius LLP

(57) ABSTRACT

A link apparatus of a variable rear spoiler for a vehicle, may include an outer linkage coupled to a motorized rotating drive shaft, a base bracket affixed to a vehicle body and a spoiler bracket connected to a rear spoiler, wherein the outer linkage determines a withdrawal height of the rear spoiler at a fully open state of the rear spoiler, and an inner linkage positioned inside of the outer linkage and coupled to the drive shaft, the base bracket, and the spoiler bracket, wherein the inner linkage determines a withdrawal angle of the rear spoiler at the fully open state of the rear spoiler.

11 Claims, 9 Drawing Sheets

LINK APPARATUS OF VARIABLE REAR SPOILER FOR VEHICLE

CROSS-REFERENCE TO RELATED APPLICATION

The present application claims priority of Korean Patent Application Number 10-2013-0160188 filed on Dec. 20, 2013, the entire contents of which application are incorporated herein for all purposes by this reference.

BACKGROUND

1. Field of the Invention

The present invention relates to a link apparatus of a variable rear spoiler for a vehicle, and more specifically to a link apparatus of a variable rear spoiler which is drawn and housed in accordance with vehicle speed.

2. Description of Related Art

As a vehicle is driven at increasing speeds, it is natural for the body of the vehicle to rise up, this causes the traction or grip of the tire to weaken thereby lessening the vehicle's stability and also limiting the vehicle from being driven at high speeds.

In order to prevent this, an attachment corresponding to a spoiler is necessary to place downward pressure on a body of a vehicle, the name 'air spoiler' is generally in accordance with the action of changing the airflow.

In recent years, a trend is growing for applying a variable rear spoiler which is drawn and housed in accordance with a vehicle speed matching with a gentrified vehicle, and FIGS. 1(A) and (B) are views of a rear spoiler 1 in a housed and drawn state.

The variable rear spoiler is typically drawn and housed by the rotational movement of a link device which receives power from a motor, wherein the link device as in the related art includes, a drive link 11 which rotates by receiving power from a motor. a fixing link 12 affixed to a vehicle body. an upper link 13 hinged to the drive link 11 and connected to a spoiler bracket 3. a rotary link 14 both ends of which are hinged to the fixing link 12 and the upper link. an intermediate link 15 connected to the rotary link 14, as shown in FIG. 2.

With respect to the link device when the rear spoiler 1 is withdrawn, as illustrated above, the drive link 11, fixing link 12, upper link 13, and the rotary link 14 are unfolded into a trapezoidal shape, and at this time the intermediate link 15 supports the rotary link 14, thereby becoming a structure for supporting load input from the spoiler 1.

However, according to the conventional link device, the intermediate link 15 is able to support the rotary link 14 only when the rear spoiler 1 is fully opened, thus the operation of the rear spoiler 1 needs to be set as a single stage control of a closed state (housed state) and a fully opened state (withdrawn state).

That is, according to the conventional link device, the rear spoiler 1 is unable to be controlled to the semi-open state, and thus electricity must be continuously applied to the motor so as to maintain the semi-open state. In this case, the load on the motor is increased and there is risk of damage, particularly reducing fuel efficiency.

In addition, according to the conventional link device, the intermediate link 15 is used for bearing the load applied while the rear spoiler 1 is in the fully open state, thereby increasing the number of components, weight, and costs.

In addition, according to the conventional link device, only the withdrawn height of the spoiler bracket 3 can be adjusted by the configuration of the upper link 13 and the rotary link 14 in accordance with the rotation of the drive link 11, and the withdrawn angle thereof cannot be adjusted, accordingly a withdrawn angle of a rotary variable rear spoiler 1 cannot be adjusted.

In addition, according to the conventional link device, a drive link 11, fixing link 12, upper link 13, and a rotary link 14 are arranged in a single type linkage to form a trapezoid shape while they are unfolded, and the torque and external force required to withdraw and house the rear spoiler 1 are concentrated on the single linkage and thus it causes a low load dispersion effect and a weak durability. Further, when the thickness of the links is increased to reinforce the durability of the links, the operation responsibility is reduced with increases in weight and cost occurring.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a link apparatus of a variable rear spoiler for a vehicle, wherein the opened state (withdrawn state) of the rear spoiler, a two trapezoidal-shaped or rectangular-shaped dual linkage type link apparatus is able to control the rear spoiler in the open state as two stages of the semi open state and the fully open state, particularly an apparatus in the semi open state which may be able to prevent damage components and aim to improve fuel efficiency by not having to use power from the motor.

In an aspect of the present invention, a link apparatus of a variable rear spoiler for a vehicle, may include an outer linkage coupled to a motorized rotating drive shaft, a base bracket affixed to a vehicle body and a spoiler bracket connected to a rear spoiler, wherein the outer linkage determines a withdrawal height of the rear spoiler at a fully open state of the rear spoiler, and an inner linkage positioned inside of the outer linkage and coupled to the drive shaft, the base bracket, and the spoiler bracket, wherein the inner linkage determines a withdrawal angle of the rear spoiler at the fully open state of the rear spoiler.

The outer linkage may include an outer drive link, a first end of which is engaged to a first end of the drive shaft to be rotated integrally with the drive shaft, an outer upper link, both ends of which are rotatably hinged to a second end of the outer drive link and a rear side of the spoiler bracket respectively, and an outer follower link having a first end rotatably hinged to a first side of the base bracket and a second end rotatably hinged to a portion between the both ends of the outer upper link.

The inner linkage may include an inner drive link positioned inward of the outer drive link, wherein a first end of the inner drive link is engaged with the drive shaft so as to be integrally rotated, an inner upper link, both ends of which are rotatably hinged to a second end of the inner drive link and a first end of the spoiler bracket, and an inner follower link having a first end rotatably hinged to on a second side of the base bracket and a second end rotatably hinged to a portion disposed between the both ends of the inner upper link.

A bracket protrusion is integrally formed protruding on a first side of the base bracket, and controls a downward rotation of the outer follower link contacting the outer follower link when the rear spoiler is operated into a closed state.

A link protrusion is integrally formed protruding on the outer follower link, and controls an upward rotation of the outer follower link contacting the outer follower link at the fully open state of the rear spoiler.

At the fully open state of the rear spoiler, the second end of the outer upper link hinged to the spoiler bracket is positioned higher than the first end of the outer upper link hinged to the outer drive link.

At the fully open state of the rear spoiler, the outer follower link is maintained at substantially a right angle to the spoiler bracket so as to stably support a load input from the rear spoiler while electricity is not applied to a motor driving the drive shaft.

At the fully open state of the rear spoiler, a second end of the inner upper link hinged to the spoiler bracket is positioned higher than a first end of the inner upper link hinged to the inner drive link.

The inner drive link is formed with an arc shape protruded frontward at an intermediate area between both ends thereof and the inner follower link is formed with an arc shape protruded rearward at an intermediate area between both ends thereof as to stably support a load input from the rear spoiler at a semi-open state of the rear spoiler while electricity is not applied to the motor driving the drive shaft.

At the fully open state of the rear spoiler the outer linkage is extended in a form of a trapezoidal shape or rectangular shape so as to stably support a load input from the rear spoiler.

At the fully open state of the rear spoiler the inner linkage is extended in a form of a trapezoidal shape or rectangular shape so as to stably support a load input from the rear spoiler.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1A:
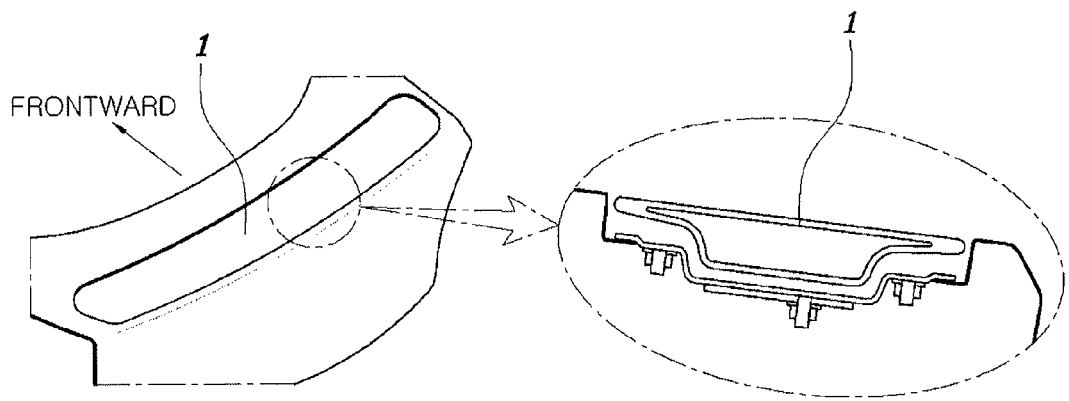
FIGS. 1(A), and 1(B) are views of a variable rear spoiler for a vehicle in both a withdrawn and stored position.
Figure 1B:
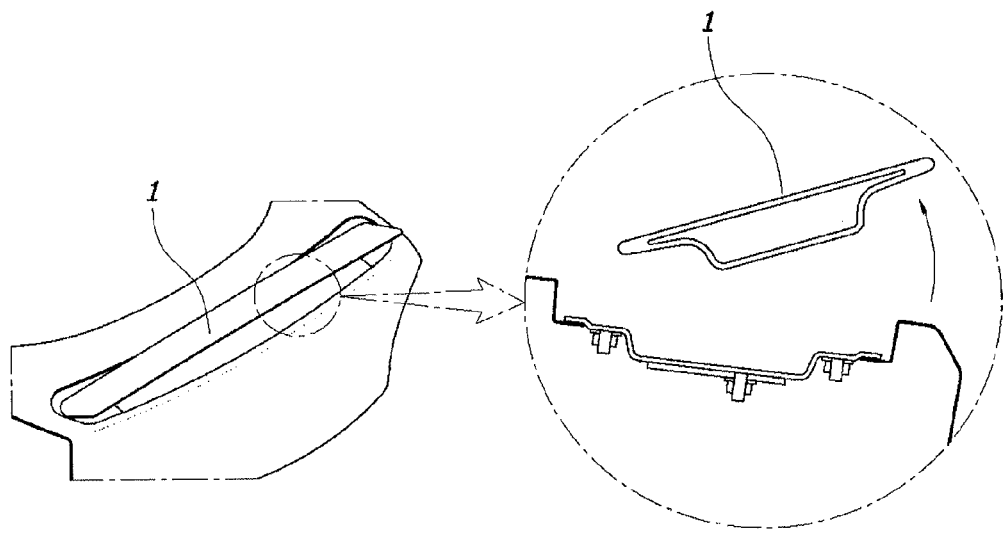
Figure 2:
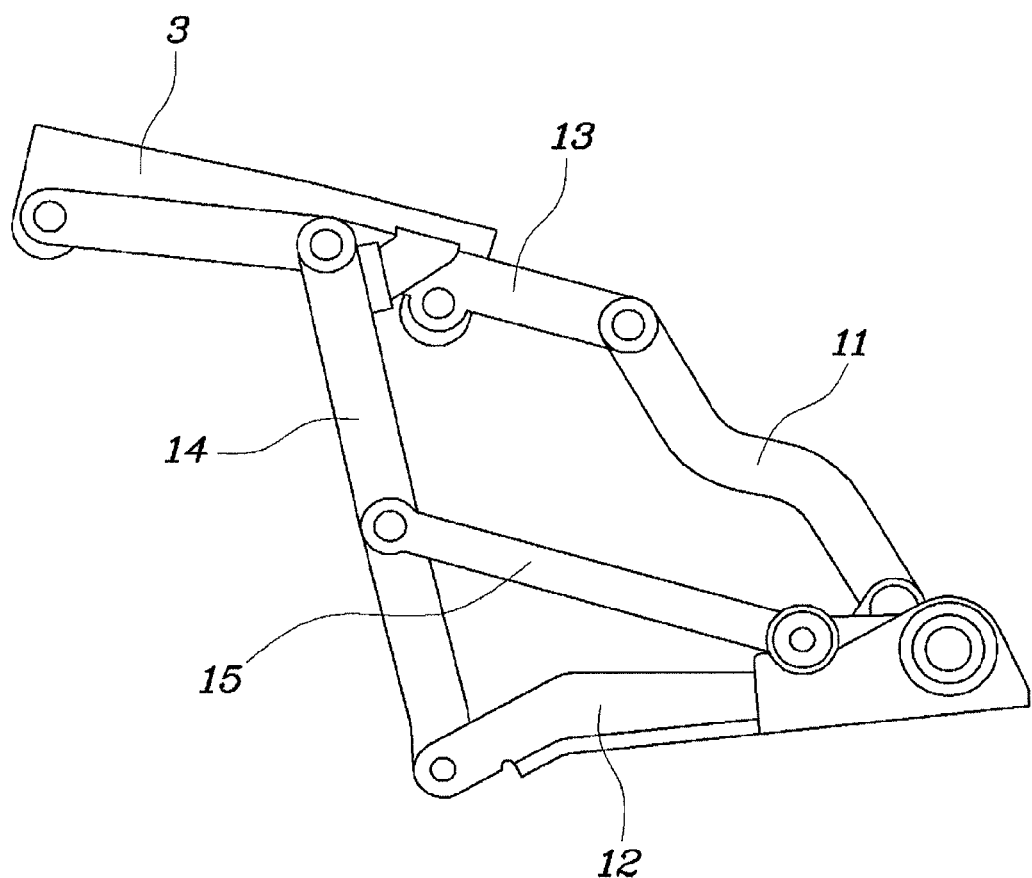
FIG. 2 is a view for explaining the conventional link device.
Figure 3:
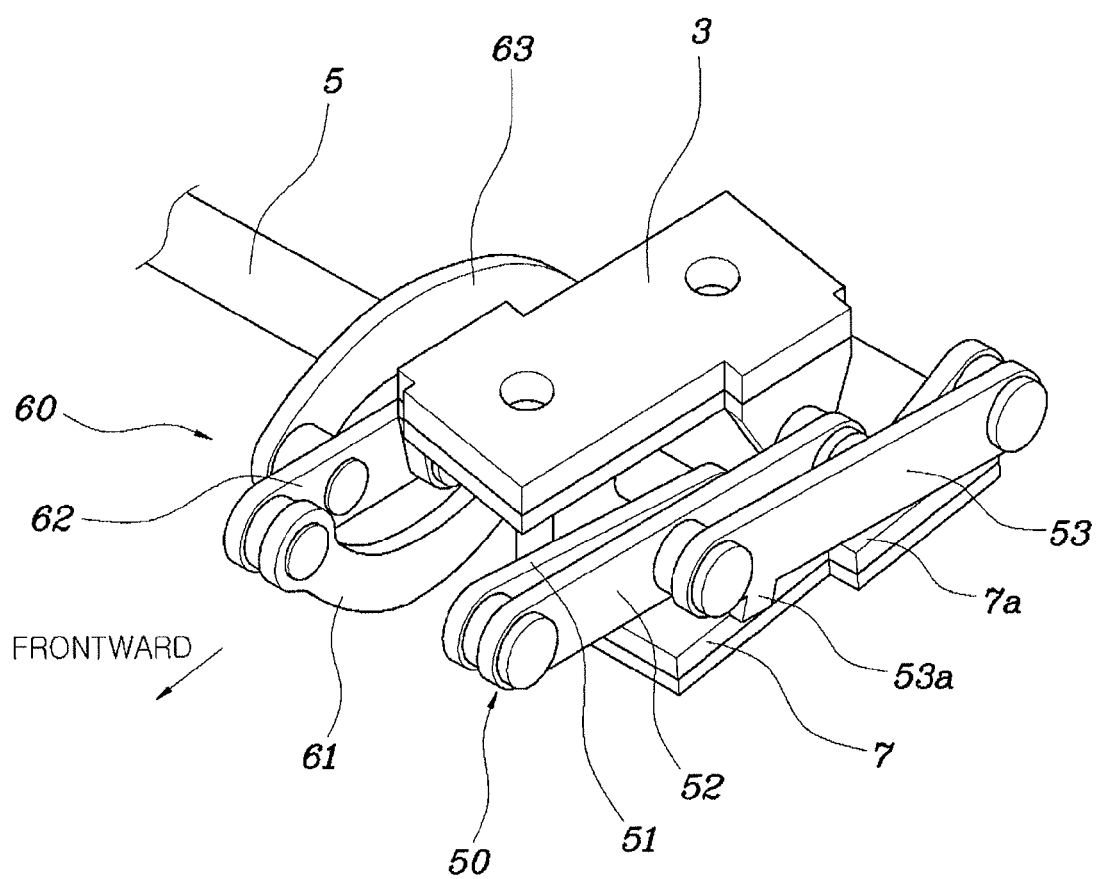
FIG. 3 is a perspective view of the link device of a variable rear spoiler for a vehicle according to an exemplary embodiment of the present invention, as shown from the outer linkage of the rear spoiler in a housed position.
Figure 4:
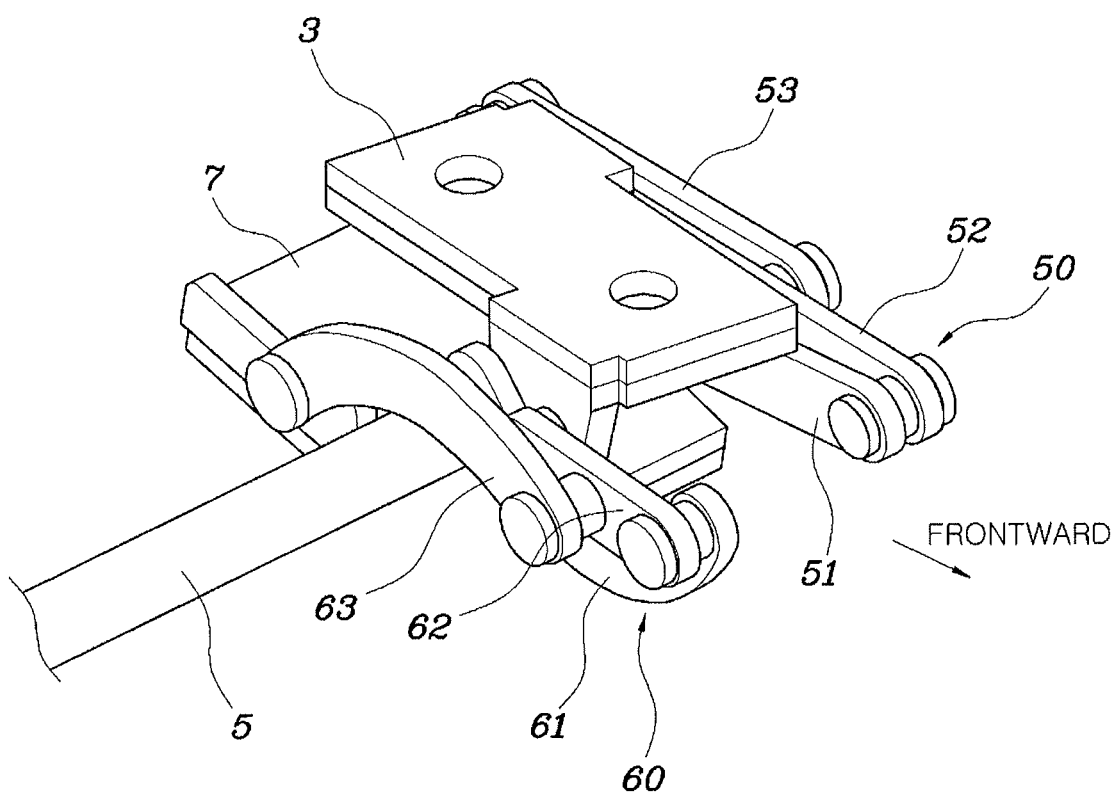
FIG. 4 is a perspective view of FIG. 3 shown from the inner linkage.
Figure 5:
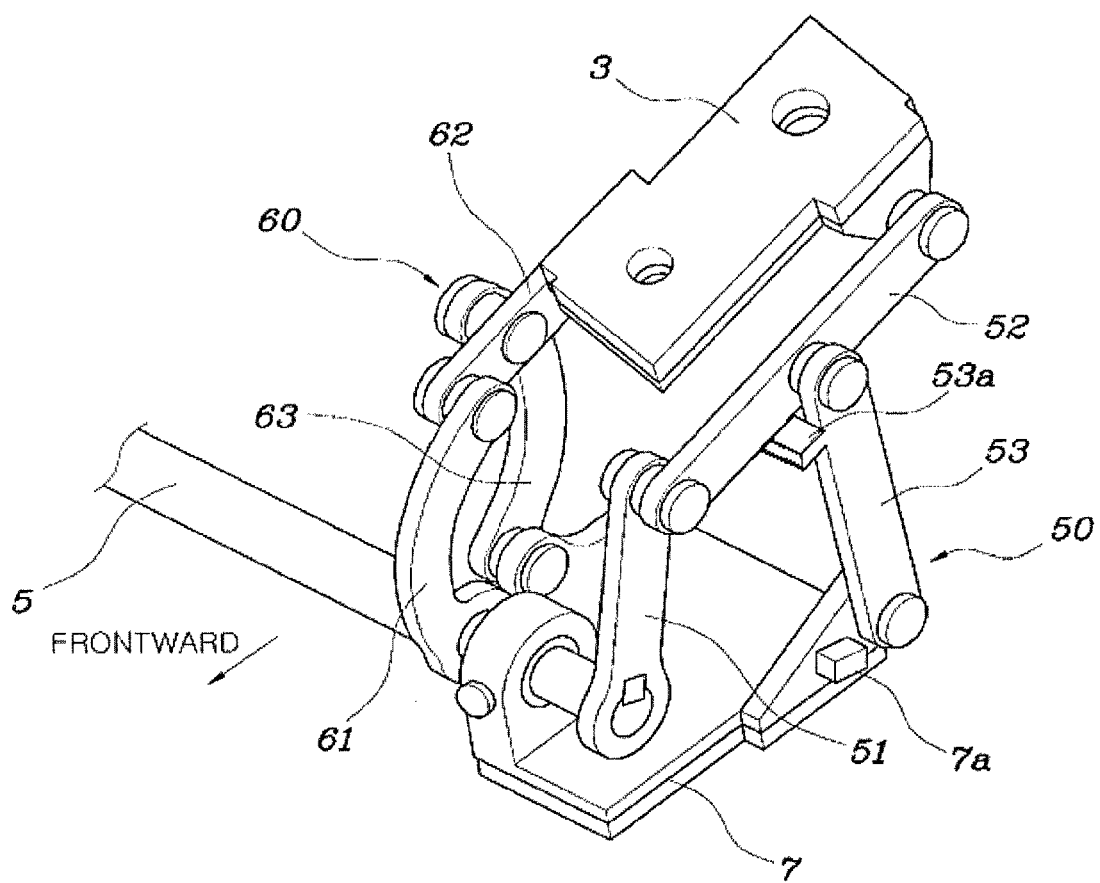
FIG. 5 is a view of the rear spoiler in the fully open state shown from the outer linkage.
Figure 6:
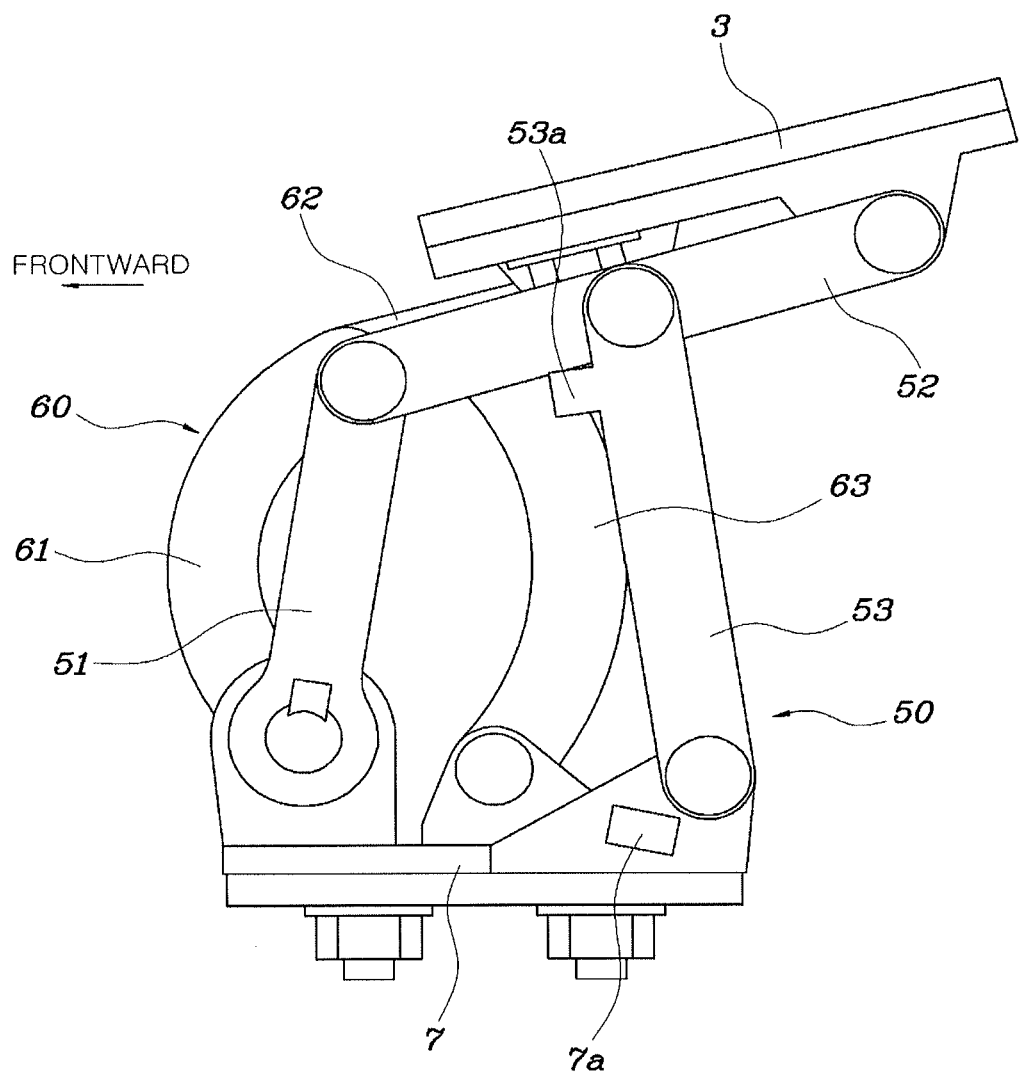
FIG. 6 is a front view of FIG. 5 shown from the outer linkage.
Figure 7:
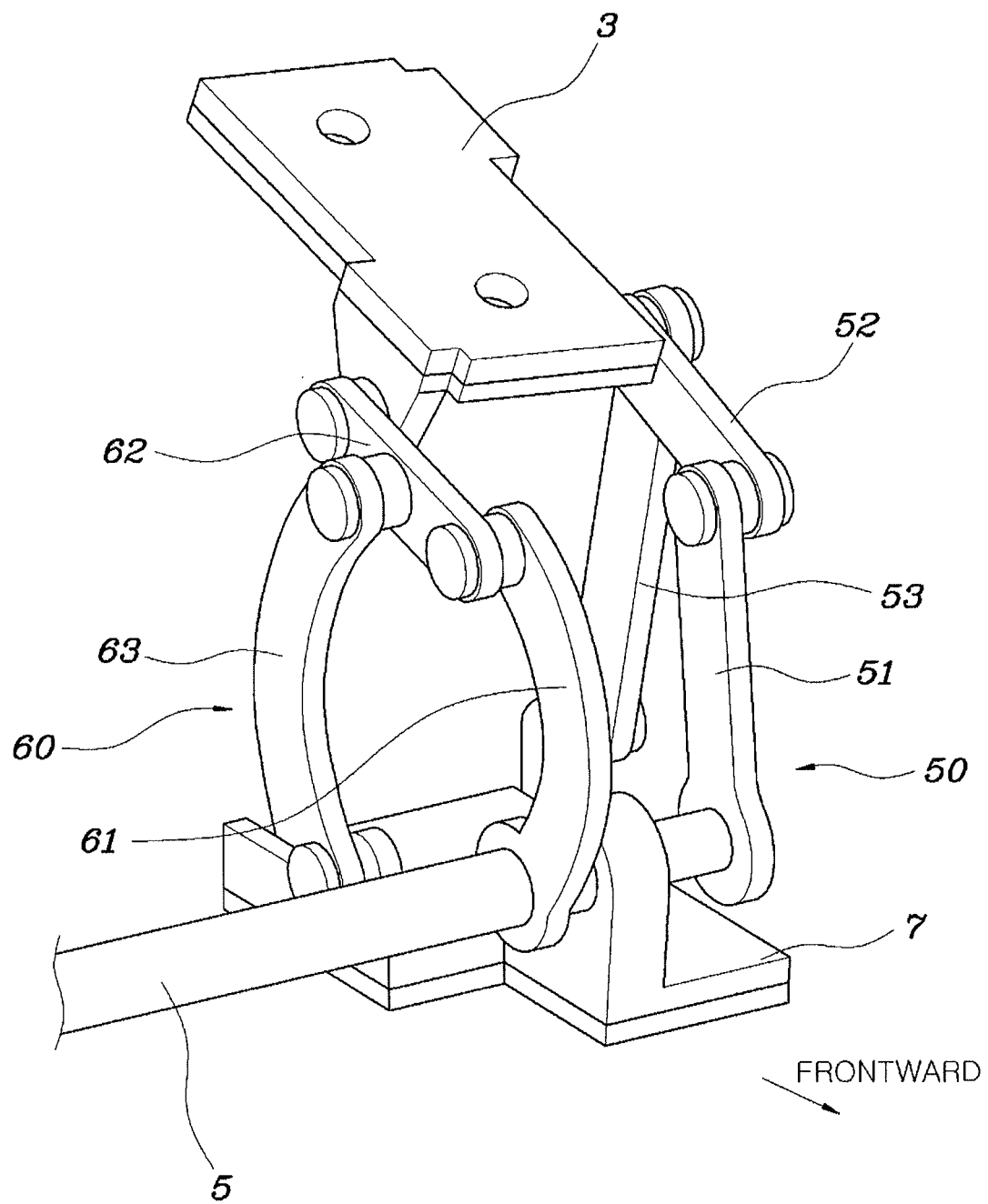
FIG. 7 is a perspective view of FIG. 5 as shown from the inner linkage.

It should be understood that the accompanying drawings are not necessarily to scale, presenting a somewhat simplified representation of various exemplary features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail with reference to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover the exemplary embodiments as well as various alternatives, modifications, equivalents, and other embodiments. which may be included within the spirit and scope of the invention as defined by the accompanying claims.

Hereinafter, a link device of a variable rear spoiler for a vehicle will be described with reference to the accompanying drawings according to an exemplary embodiment of the present invention.

The link device of a variable rear spoiler for a vehicle according to an exemplary embodiment of the present invention, as shown in the exemplary embodiments of FIGS. 3 to 9, includes, an outer linkage 50 may be connected to a motorized rotating drive shaft 5, base bracket 7 affixed to the vehicle body and a spoiler bracket 3 coupled to a rear spoiler 1, wherein the outer linkage may determine the withdrawn height of the rear spoiler 1 in the fully open state of the rear spoiler 1 (at a withdrawal state of approximately 12° degrees). and an inner linkage 60 which is positioned inside of the outer linkage 50 and connected to the drive shaft 5, the base bracket 7, and the spoiler bracket 3, and determines the withdrawal angle of the rear spoiler 1 in the fully open state of the rear spoiler 1.

Both ends of the drive shaft 5 pass through the base bracket 7 for the drive shaft to be rotated axially, the outer linkages 50 are connected to both ends of the drive shaft 5 located at the outer side based on the pass through portion of the base bracket 7, respectively, the inner linkage 60, which is positioned at the inner side of the outer linkage 50, is coupled to the drive shaft 5.

The outer linkage 50 includes an outer drive link 51, one end of which is connected to one end of the drive shaft 5 to be rotated integrally with the drive shaft 5, an outer upper link 52, both ends of which are hinged to the other end of the outer drive link 51 and to a rear side of the spoiler bracket 3, respectively; and an outer follower link 53, one end of which is rotatably hinged to one side of the base bracket 7 and the other end of which is rotatably hinged to the upper link 52.

The outer linkage 50 can stably support the load input through the rear spoiler 1, by the outer drive link 51, the outer upper link 52, the outer follower link 53 and the base bracket 7 being unfolded to form a trapezoidal-shaped or rectangular-shaped while the rear spoiler 1 is in the fully open state, thereby.

Also, the inner linkage (60) includes, the inner drive link 61 which is positioned inward of the outer drive link 51 and one end of which is connected to be rotated integrally with the drive shaft 5. an inner upper link 62, both ends of which are rotatably hinged to the other end of the inner drive link 61 and to a front side of the spoiler bracket 3, respectively; and. an inner follower link 63, one end of which rotatably hinged to the other side of the base bracket 7 and the other end of which is rotatably hinged to the inner upper link 62.

The inner linkage 60 is also unfolded to form a trapezoidal-shape or rectangular-shape together with the inner drive link 61, the inner upper link 62, and the inner follower link 63 while the rear spoiler 1 is in the fully open state, thereby supporting stably the load input through the rear spoiler 1, together with the outer linkage 50.

In order to embody a rotation type variable rear spoiler, the withdrawal height and withdrawal angle of the rear spoiler 1 serve as important factors wherein according to an exemplary embodiment of the present invention, the outer linkage 50 becomes a factor for determining the withdrawal height of the rear spoiler 1 and the inner linkage 60 becomes a factor for determining the withdrawal angle of the rear spoiler 1.

That is, according to an exemplary embodiment of the present invention, the roles of determining the withdrawal height and withdrawal angle of the rear spoiler 1 serving as important factors for a rotation type variable rear spoiler are divided through a dual-linkage system including the outer linkage 50 and the inner linkage 60, through which a rotation-type variable rear spoiler can be further stably designed.

On one side of the base bracket 7, a bracket protrusion 7a is integrally formed protruding and controls the downward rotation of the outer follower link 53 by contacting the outer follower link 53 when the rear spoiler 1 is operated into the closed (housed) state.

A link protrusion 53a is integrally formed protruding on the outer follower link 53 and controls the upward rotation of the outer follower link 53 by contacting the outer upper link 52 when the rear spoiler 1 is in the fully open state. That is, the bracket protrusion 7a is an element which controls the housing operation of the rear spoiler 1 by contacting the outer follower link 53, and the link protrusion 53a is an element which controls the fully opening operation of the rear spoiler 1 by contacting the outer upper link 52.

According to an exemplary embodiment of the present invention, the other end of the outer upper link 52 hinged to the spoiler bracket 3 is positioned higher than the one end of the outer upper link 52 hinged to the outer drive link 51 when the rear spoiler 1 is in the fully open state, thereby determining the withdrawal height of the rear spoiler 1.

In addition, according to an exemplary embodiment of the present invention, the outer follower link 53 is maintained at substantially a right angle to the spoiler bracket 3 at the fully open state of the rear spoiler 1 while electricity is not applied to the motor so as to stably support a load input from the rear spoiler 1.

The outer follower link 53 is maintained most preferably at a right angle to the spoiler bracket 3 at the fully open state of the rear spoiler 1 in order to efficiently support the load input from the rear spoiler 1, more preferably in the range of 80°~90° according to design requirements.

In addition, the present invention is characterized in that at the fully open state of the rear spoiler 1, the other end of the inner upper link 62 hinged to the spoiler bracket 3 is positioned higher than the one end of the inner upper link 62 hinged to the inner drive link 61, thereby determining the withdrawal angle of the rear spoiler 1.

Figure 8:
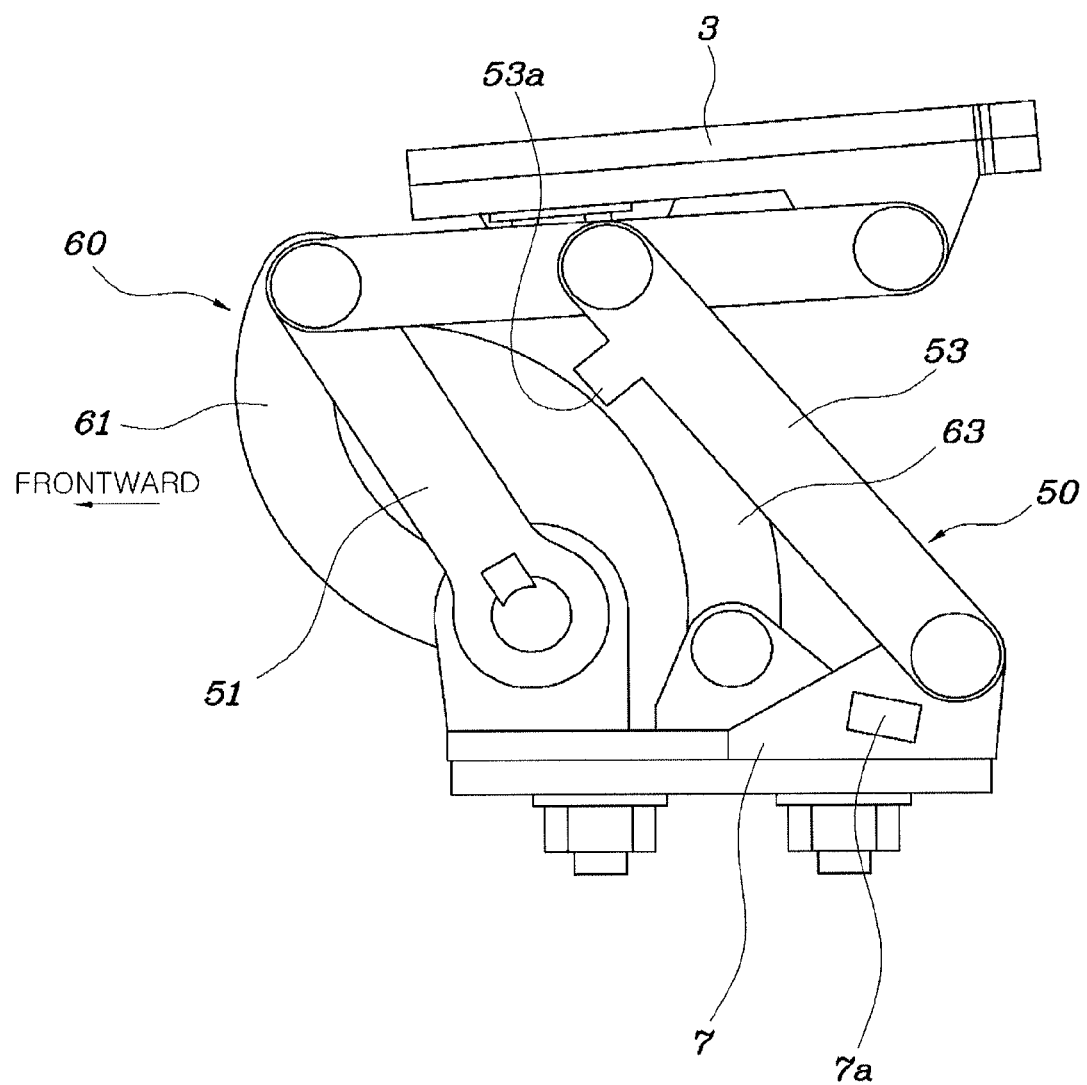
FIG. 8 is a front view of the rear spoiler in a semi open state as shown from the outer linkage.
Figure 9:
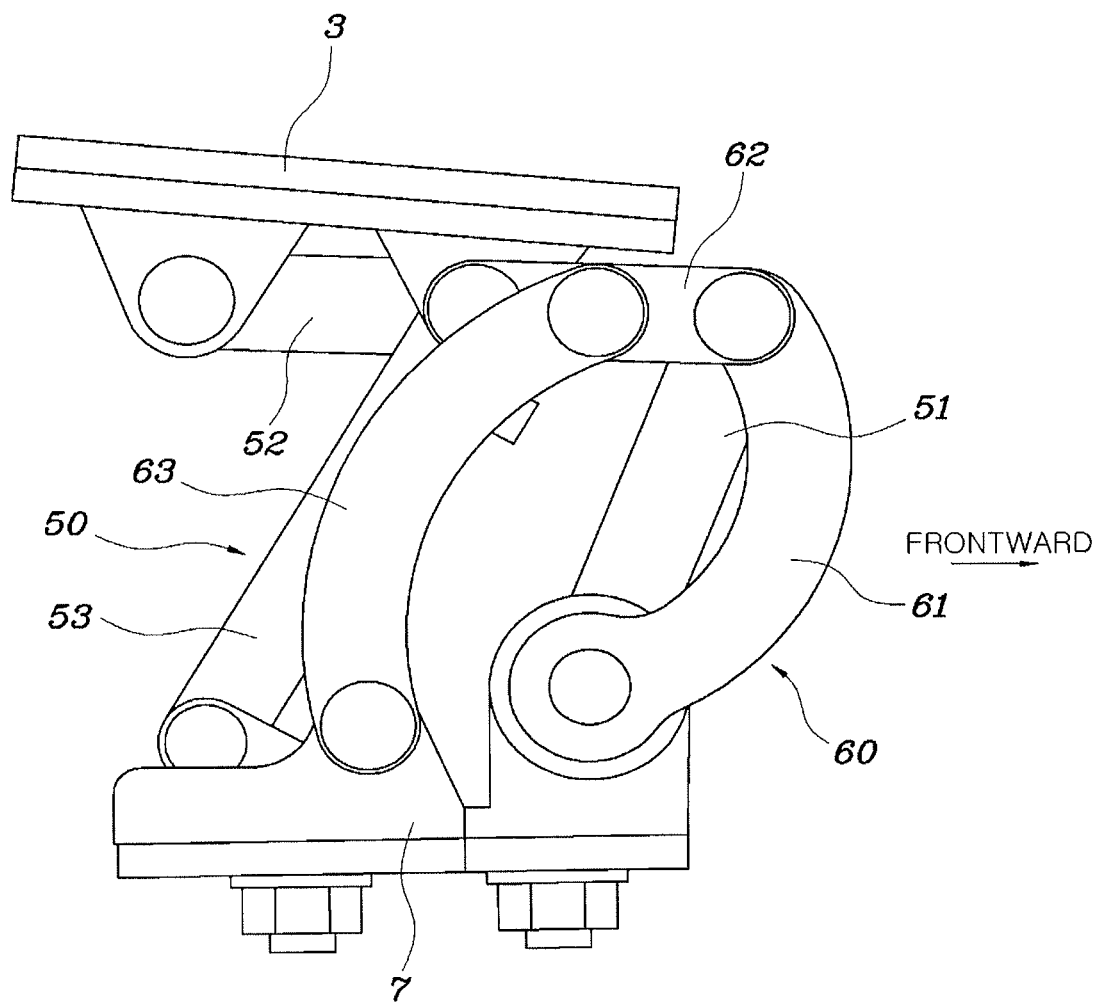
FIG. 9 is a front view of FIG. 8 shown from the inner linkage.

Also, as shown in FIGS. 8 and 9, the inner drive link 61 is formed with an arc shape protruding frontward at the intermediate area between both ends thereof and the inner follower link 63 is formed with an arc shape protruding rearward at the intermediate area between both ends thereof so as to support efficiently a load input from the rear spoiler 1 at the semi open state (withdrawn in an angle of about 5 degree) of the rear spoiler 1 while the electricity is not applied to the motor.

As described above, according to the exemplary embodiment of the present invention, the open state of the rear spoiler 1 is controlled as two stages of the semi open state and the full-open state through the dual linkage type outer linkage 50 and inner linkage 60, which form two trapezoidal shapes or rectangular-shapes, while the rear spoiler 1 is in the open state (withdrawn state), thus can efficiently improve drag and rear lift of the vehicle by using the rear spoiler 1 according to the vehicle's speed, thereby promoting efficiency improvements to fuel efficiency and driving stability.

In particular, even though electricity is not applied to the motor at the semi open state of the rear spoiler 1, the inner linkage 60 can efficiently support the load input from the rear spoiler 1, thereby prevent the failure of the motor due to overload because of the power of the motor being turned off, further, it has an advantage to promote the improvement of fuel efficiency.

In addition, according to an exemplary embodiment of the present invention, the outer follower link 53 having the outer linkage 50 can support the load input from the rear spoiler 1, thereby the intermediate link of the prior art for supporting load is not used, thus can reduce the number of components, reduce weight of the vehicle, and save costs.

Further, the dual linkage including the outer linkage 50 and the inner linkage 60 can simultaneously control the withdrawal height and angle of the rear spoiler 1, thus it has an advantage in that the rotating type variable rear spoiler can be designed more efficiently and more stably.

Further, according to an exemplary embodiment of the present invention, the torque and external force required for withdrawing and housing the rear spoiler 1 can efficiently be distributed through the dual linkage including the outer linkage 50 and the inner linkage 60, thereby reducing the thickness and rigidity of the links and promoting the improvement to system stability and the reduction of package.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A link apparatus of a variable rear spoiler for a vehicle, comprising:
   an outer linkage coupled to a motorized rotating drive shaft, a base bracket affixed to a vehicle body and a spoiler bracket connected to a rear spoiler, wherein the outer linkage determines a withdrawal height of the rear spoiler at a fully open state of the rear spoiler; and
   an inner linkage positioned inside of the outer linkage and coupled to the drive shaft, the base bracket, and the spoiler bracket, wherein the inner linkage determines a withdrawal angle of the rear spoiler at the fully open state of the rear spoiler, wherein the outer linkage includes first, second, and third links that are separately provided,
a first end of the first link is engaged to a first end of the drive shaft to be rotated integrally with the drive shaft,
a first end of one of the second and third links is rotatably hinged to the base bracket, and a first end of the other of the second and third links is rotatably hinged to the spoiler bracket, and
two portions of one of the first, second, and third links are rotatably hinged to respective second ends of the other two of the first, second, and third links.

2. The link apparatus of the variable rear spoiler for the vehicle of claim 1, wherein:
the first link is an outer drive link, a first end of which is engaged to the first end of the drive shaft to be rotated integrally with the drive shaft;
the second link is an outer upper link having the second end rotatably hinged to the second end of the outer drive link and the first end rotatably hinged to a rear side of the spoiler bracket; and
the third link is an outer follower link having the first end rotatably hinged to a first side of the base bracket and the second end rotatably hinged to a portion between the first and second ends of the outer upper link.

3. The link apparatus of the variable rear spoiler for the vehicle of claim 2, wherein the inner linkage comprises:
an inner drive link positioned inward of the outer drive link, wherein a first end of the inner drive link is engaged with the drive shaft so as to be integrally rotated;
an inner upper link, both ends of which are rotatably hinged to a second end of the inner drive link and a first end of the spoiler bracket; and
an inner follower link having a first end rotatably hinged to on a second side of the base bracket and a second end rotatably hinged to a portion disposed between the both ends of the inner upper link.

4. The link apparatus of the variable rear spoiler for the vehicle of claim 2, wherein a bracket protrusion is integrally formed protruding on a first side of the base bracket, and controls a downward rotation of the outer follower link contacting the outer follower link when the rear spoiler is operated into a closed state.

5. The link apparatus of the variable rear spoiler for the vehicle of claim 2, wherein a link protrusion is integrally formed protruding on the outer follower link, and controls an upward rotation of the outer follower link contacting the outer upper link at the fully open state of the rear spoiler.

6. The link apparatus of the variable rear spoiler for the vehicle of claim 2, wherein at the fully open state of the rear spoiler, the first end of the outer upper link hinged to the spoiler bracket is positioned higher than the second end of the outer upper link hinged to the outer drive link.

7. The link apparatus of the variable rear spoiler for the vehicle of claim 2, wherein at the fully open state of the rear spoiler, the outer follower link is maintained at substantially a right angle to the spoiler bracket so as to stably support a load input from the rear spoiler while electricity is not applied to a motor driving the drive shaft.

8. The link apparatus of the variable rear spoiler for the vehicle of claim 3, wherein at the fully open state of the rear spoiler, a second end of the inner upper link hinged to the spoiler bracket is positioned higher than a first end of the inner upper link hinged to the inner drive link.

9. The link apparatus of the variable rear spoiler for the vehicle of claim 3, wherein the inner drive link is formed with an arc shape protruded frontward at an intermediate area between both ends thereof and the inner follower link is formed with an arc shape protruded rearward at an intermediate area between both ends thereof as to stably support a load input from the rear spoiler at a semi-open state of the rear spoiler while electricity is not applied to the motor driving the drive shaft.

10. The link apparatus of the variable rear spoiler for the vehicle according to claim 1, wherein at the fully open state of the rear spoiler the outer linkage is extended in a form of a trapezoidal shape or rectangular shape so as to stably support a load input from the rear spoiler.

11. The link apparatus of the variable rear spoiler for the vehicle according to claim 1, wherein at the fully open state of the rear spoiler the inner linkage is extended in a form of a trapezoidal shape or rectangular shape so as to stably support a load input from the rear spoiler.

* * * * *